US00RE39290E

(19) United States
(12) Reissued Patent
Sage

(10) Patent Number: US RE39,290 E
(45) Date of Reissued Patent: Sep. 19, 2006

(54) LIGHT AIRCRAFT SUPERCHARGER SYSTEM

(76) Inventor: Rodney G. Sage, 9999 E. Yale, #A208, Denver, CO (US) 80231

(21) Appl. No.: 10/142,748

(22) Filed: May 10, 2002

Related U.S. Patent Documents

Reissue of:
(64) Patent No.: 6,328,023
Issued: Dec. 11, 2001
Appl. No.: 09/542,811
Filed: Apr. 4, 2000

(51) Int. Cl.
*F02B 33/00* (2006.01)

(52) U.S. Cl. ..... 123/559.1; 123/559.3
(58) Field of Classification Search ..... 123/559.1, 123/559.3
See application file for complete search history.

(56) References Cited

U.S. PATENT DOCUMENTS 2,592,119 A * 4/1952 Chilton ..... 123/559.1
2,741,234 A * 4/1956 Wiseman ..... 123/559.1
4,723,526 A * 2/1988 Horiuchi et al. ..... 123/559.1
5,058,546 A * 10/1991 Lawrence ..... 123/198 C
5,060,622 A * 10/1991 Suzuki ..... 123/559.1
5,085,199 A * 2/1992 Sado et al. ..... 123/559.1
5,224,459 A * 7/1993 Middlebrook ..... 123/559.1
5,289,813 A * 3/1994 Adachi et al. ..... 123/559.3
5,392,751 A * 2/1995 Matsubara et al. ..... 123/559.1
5,402,765 A * 4/1995 Spinnler ..... 123/559.1
5,423,304 A * 6/1995 Lawrence et al. ..... 123/559.1
5,882,181 A * 3/1999 Genter et al. ..... 123/559.1 X
6,082,340 A * 7/2000 Heimark ..... 123/559.1
6,092,511 A * 7/2000 Middlebrook ..... 123/559.1
6,129,510 A * 10/2000 Martin ..... 123/559.1 X

FOREIGN PATENT DOCUMENTS

GB 626072 2/1944

* cited by examiner

*Primary Examiner*—Hoang Nguyen
(74) *Attorney, Agent, or Firm*—Timothy J. Martin; Michael R. Henson

(57) ABSTRACT

An aircraft having a supercharger installed from a retrofit kit and a retrofit kit for retrofitting a supercharger 24 in or below the separation space (21) of an aircraft engine compartment or nacelle which is made up of a supercharger (24), one or more mounting plates (26) (54) and a drive pulley assembly (35) (53). The kits can also include a mounting bracket (25) and front connector mounting (52).

30 Claims, 11 Drawing Sheets

LIGHT AIRCRAFT SUPERCHARGER SYSTEM

Matter enclosed in heavy brackets [ ] appears in the original patent but forms no part of this reissue specification; matter printed in italics indicates the additions made by reissue.

BACKGROUND OF THE INVENTION

Superchargers have been used to enhance aircraft, automotive and marine engine performance for decades. With the passage of time, automotive and aircraft engine compartments have become increasingly crowded and complicated as improvements and accessories are added.

Representative supercharger/engine configurations are found in:

U.S. Pat. No. 5,392,751 Taiji Matsubara where FIGS. 1 and 2 depict vividly the space limitations in a modern automotive engine compartment. Here, the supercharger is cradled between the cylinder banks of a V-type engine so as to avoid interference with other accessories, etc., in the engine compartment.

U.S. Pat. No. 5,224,459 to James Middlebrook teaches the configuration of a gear-driven, centrifugal supercharger.

U.S. Pat. No. 4,896,734 to Kenji Horiuchi et al teaches a supercharger automotive engine arrangement showing the complexity and lack of space in the modern automotive engine compartment. A direct gear drive is utilized.

U.S. Pat. No. 2,835,238 to J. W. Oehrli teaches a variable speed direct drive on a McCulloch (Paxton) supercharger and the complexity existing even in the 1950s.

U.S. Pat. No. 2,741,235 to W. A. Wiseman teaches the use of a simple, belt-driven, supercharger/aircraft engine system for installation prior to mounting the engine on an aircraft.

Problems unconnected with light aircraft, per se, virtually drove U.S. light aircraft manufacturers out of the private sector market. Early on, superchargers were useful in aircraft but were gear-driven. The supercharger/aircraft systems had many problems. The gear drives were unreliable and, as a result, aircraft turbocharging came to the fore. (See U.S. Pat. No. 2,835,238) Although the aircraft industry ended production of most of these early aircraft, they have proved to be quite airworthy when treated properly and are widely used today. In fact, the designs of recent craft follow the earlier models to a great extent.

However, users of these aircraft have needed to extend the service altitude at which the craft can be comfortably flown. For example, pilots wishing to fly in states with numerous mountain peaks with heights over 8–10,000 feet are always at risk. Additionally, pilots need increased altitude to reduce congestion of airways at lower altitudes. Finally, increased power availability during take-offs and landings provides an appreciable safety margin. Turbochargers and superchargers were slated to provide the additional power. However, turbochargers required extensive maintenance. On average, they must be rebuilt every 800–1000 hours and even when properly maintained, can shorten engine life and can damage the cylinders of the aircraft's engines. Therefore, the cost of equipment and maintenance has ensured that turbochargers have seen relatively little usage in light aircraft.

Unfortunately, the aircraft industry has not configured the engine compartment of lightweight aircraft to include superchargers. Further, so many problems arose out of the use of gear-driven superchargers and in light aircraft that they went out of use. As a result, the engine compartment or nacelle was not sized to house retrofitted superchargers and none are thought to be on the market even today.

Over time, competition in the United States essentially reduced the availability of light aircraft engines to two—the Continental and the Lycoming engines. The present invention provides a mechanism for [retrofitting] *outfitting* proven automotive superchargers into lightweight civilian aircraft using engines configured like the Lycoming or Continental engines. The installed superchargers effectively increase safe aircraft operation, i.e., performance is maintained at the 7500 foot level at altitudes of 7500–12,500 feet. Further, there is less engine stress at lower altitudes when a supercharger is used.

This invention provides kits for [retrofit] installation of superchargers on aircraft without modification of the engine cooling to improve aircraft performance after installation.

SUMMARY OF THE INVENTION

The present invention includes light aircraft having one or more [retrofitted] supercharging systems mounted in the "separation" space, i.e., the space between or below the engine airflow baffling and close to the firewall protecting the rest of the aircraft. The impeller of the supercharger is powered by the accessory drives of aircraft engines configured similarly to either of the Continental or Lycoming engines. The invention also includes kits for [the retrofitting] *installation of* superchargers in and below the separation space.

DETAILED DESCRIPTION OF THE FIGURES

The numbers used to identify specific structural elements remains the same from figure to figure although the form of the elements can change.

Figure 1:
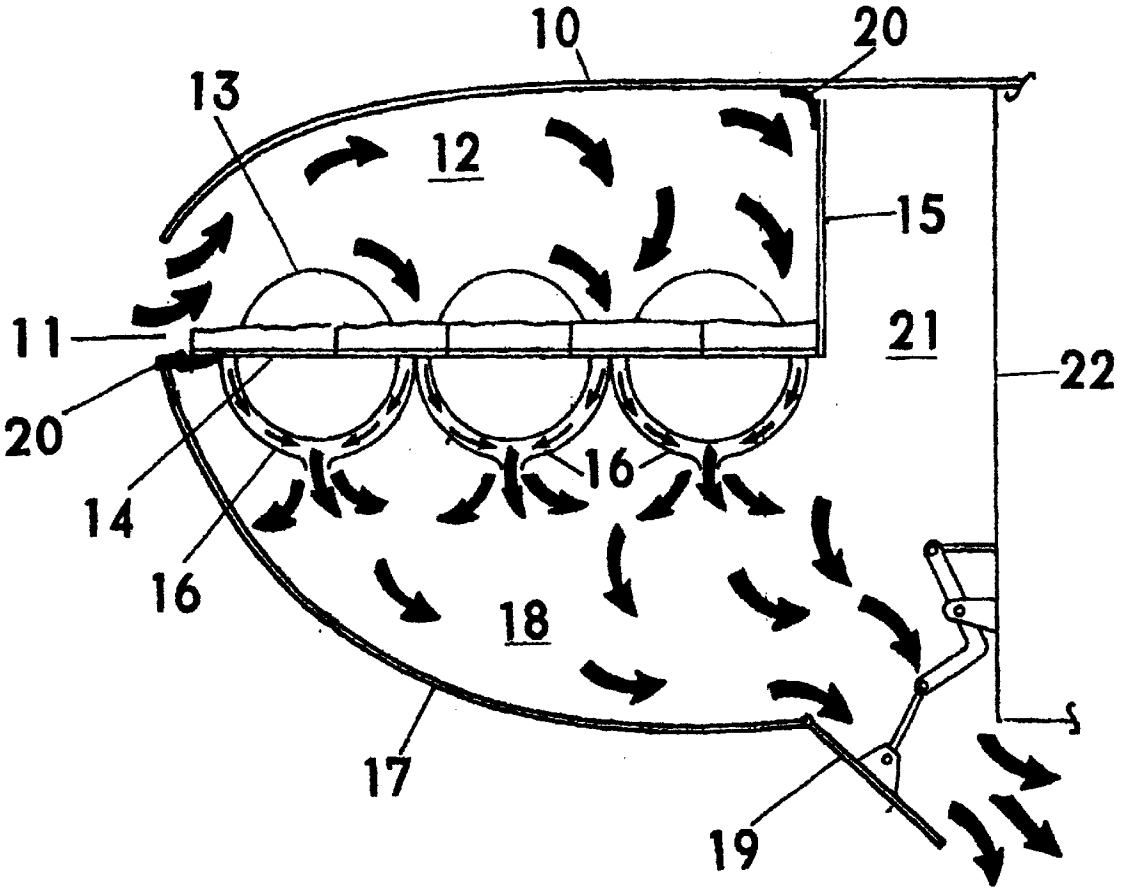
FIG. 1 is effectively a simplified section of a light aircraft engine compartment extending rearward to the firewall.

FIG. 1 diagrammatically depicts a section of the upper cowl 10 outline of an exemplary 1985 Model 182 Cessna aircraft engine compartment with the baffles and seals necessary to direct cooling airstreams over the cylinder heads and other surfaces of a Continental aircraft engine housed therein.

Air flows into the engine compartment through the opening 11 adjacent the outer edge of the propeller hub (not shown). The air flows through the upper portion of the engine compartment 12 above the cylinders 13 to the side of the cowl 10 (not shown) as indicated by the flow indicating arrows. The incoming air is forced downward by the horizontal baffle 15 and aft vertical baffles 15 through the inter-cylinder baffles 16. The lower cowl 17 forms a plenum 18 and forces the now-warmed air out via the opening formed by the extended cowl flaps 19. Seals 20 are utilized to ensure more efficient air flow. The separation space 21 between and below the aft vertical baffle 15 and firewall 22, provides the preferred positions 23 where a retrofit supercharger 24 (see FIG. 4) is installable.

Figure 2:
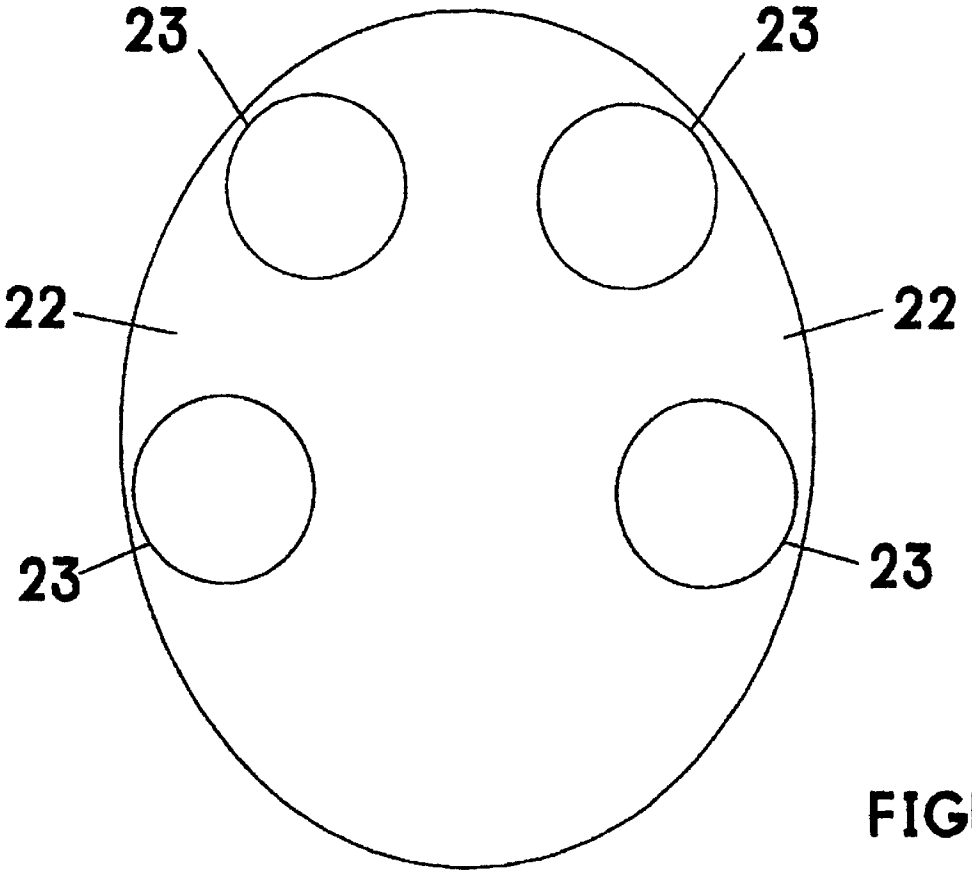
FIG. 2 outlines the preferred positions for placing superchargers for engines configured similarly to those of the Continental and Lycoming aircraft engines in a single engine craft or engine nacelle.

FIG. 2 shows the four preferred positions 23 for installing a supercharger on a firewall 22 of a single engine aircraft, preferably a C182 manufactured by Cessna Aircraft of Wichita, Kans., USA and a PA-28-R180 manufactured by Piper Aircraft of Vero Beach, Fla., USA. The upper positions 23 can more readily be used on Continental-type engines for either a direct drive or reversed rotation supercharger attachment. The lower positions 23 are preferred for superchargers for Lycoming-type engines. A supercharger 24 (see FIG. 4) can be placed at lower positions but requires more material, greater bracing distances and careful attention to air flow characteristics, supercharger heating, etc. As a result, the preferred mounting plates will be discussed in detail with the understanding that, for other positioning, the mounting plates must be elongated and, preferably, additional bracing added for vibration and stress reduction (See FIG. 5).

Figure 3:
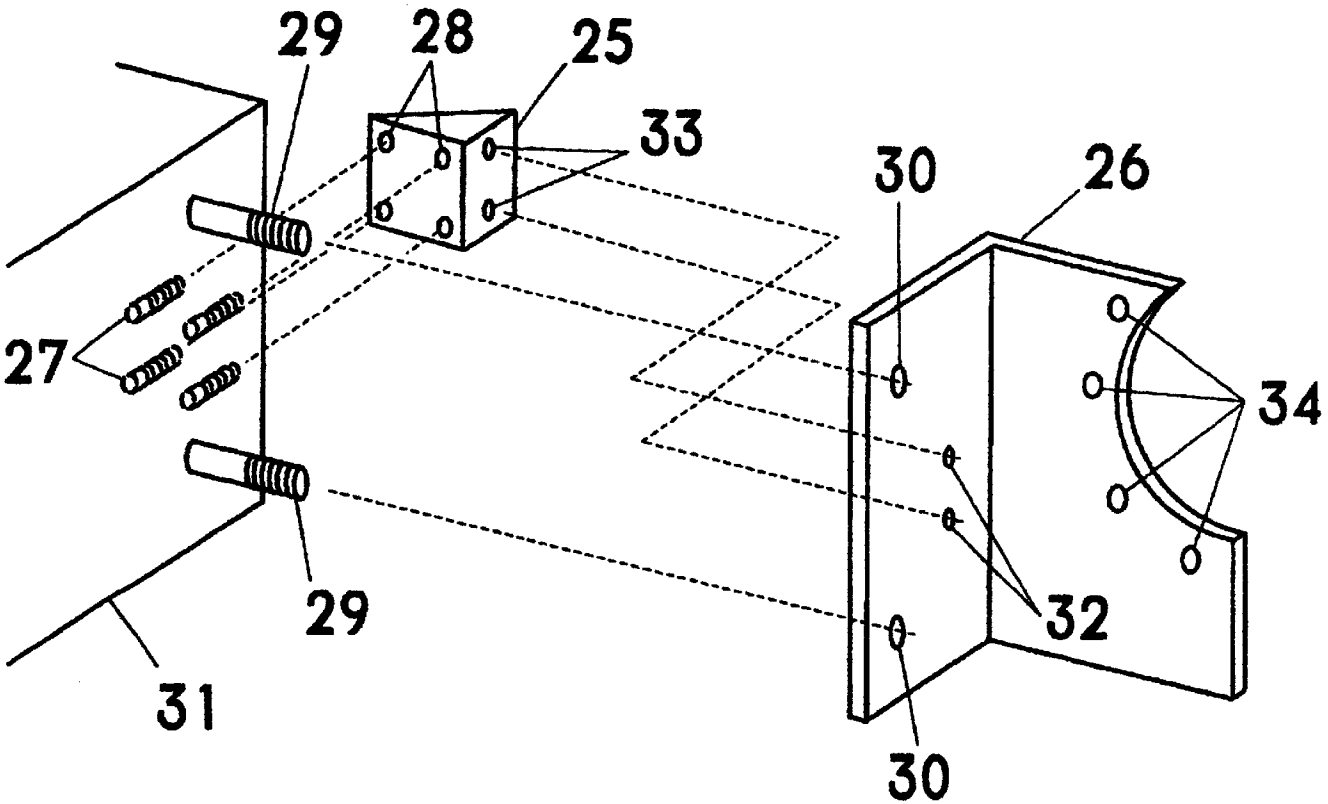
FIG. 3 diagrams the placement of a mounting bracket and mounting plate with respect to the accessory drive of a Continental-type aircraft engine.

FIG. 3 depicts a preferred form of mounting bracket 25 and mounting plate 26 which are shown here for use with a Continental aircraft engine, (Model O470R). In this configuration, the supercharger (not shown) is mounted on either of the upper positions 23 of FIG. 2. The mounting bracket 25 bolts to studs 27 via holes 28, mounting plate 26 bolts to studs 29 via holes 30. The studs 27 are threaded into the crankcase 31 adjacent the rear left corner as viewed from the front of the craft. Studs 29 pass all the way through the two halves of the crankcase.

The mounting plate 26 is also attached to mounting bracket 25 through holes 32 and 33 by AN bolts and self-locking nuts (not shown). Attaching the mounting bracket 25 and mounting plate 26 at this location ensures accessibility to the supercharger 24 and associated air intake filters (see FIG. 5) by mechanics and inspectors but minimally changes the air flow within the cowls 10 and 17. The mounting plate 26 is bolted to a supercharger 24 (not shown) via holes 34. Mounting bracket 25 and mounting plate 26 are preferably made of 6061-T6 aluminum.

Figure 4:
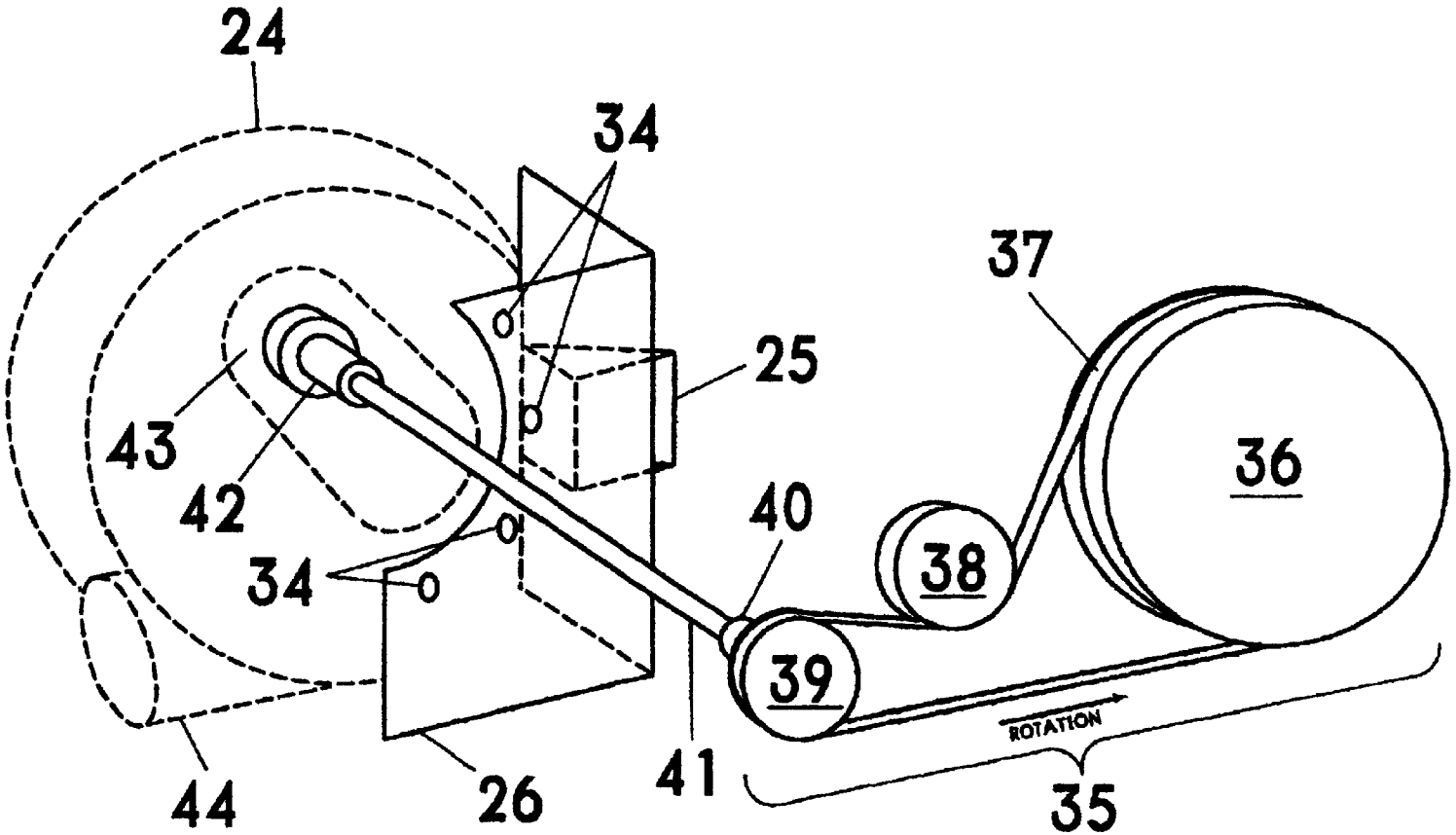
FIG. 4 depicts the placement of a mounting bracket and mounting plate with respect to the accessory drive of a Lycoming-type engine.

FIG. 4 shows a different drive attachment mechanism for use with a Lycoming-type engine where the accessory drive is located at the front of the engine. In the unit shown, the supercharger 24 is bolted to a mounting plate 26 which is, in turn, attached to mounting bracket 25 and to the crankcase 31*a* (not shown). Here, the pulley assembly 35 is made up of an accessory drive pulley 36, belt 37, belt tension adjustment pulley 38 and drive shaft pulley 39. Driven pulley 39 is attached to drive shaft coupling 40 and power drive shaft 41. Drive shaft 41 is attached to supercharger coupling 42 with a universal joint (not shown) which engages the gearing within gearing case 43 to drive the supercharger impeller (not shown).

The air filters mounted on or connected to the air inlet of the supercharger can be located within the engine space or in the space beneath the intercylinder baffles in a position where the air flow patterns minimally interfere with the cooling of the engine components and provide adequate cooling for supercharger operation. The compressed air of outlet 44 is "piped" to the engine air inlet (not shown).

Figure 5:
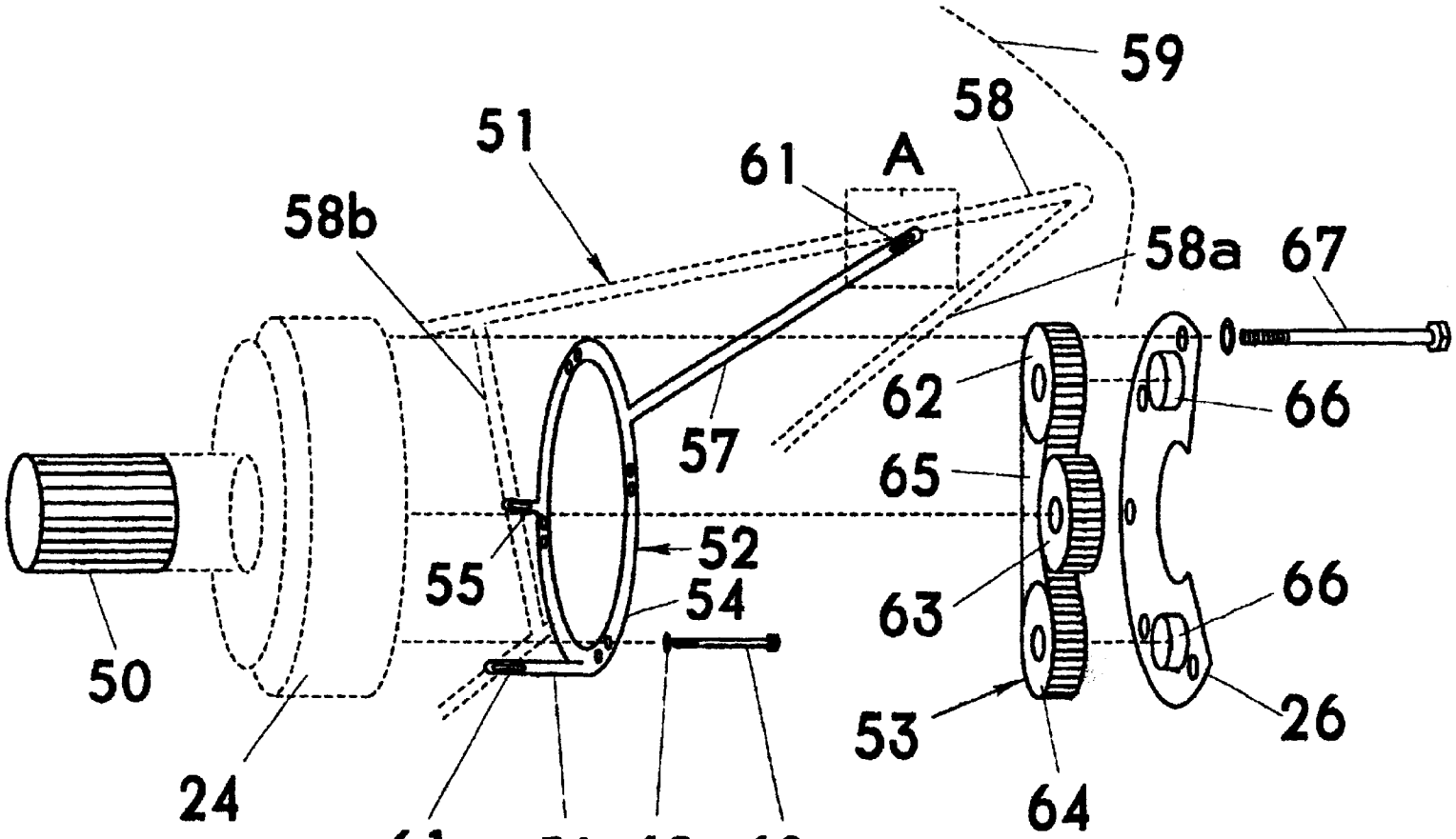
FIG. 5 depicts an additional mounting device for attaching a supercharger to the engine mounting tubing and the accessory drive of a Continental-type engine.

FIG. 5 provides a partially diagrammatic exploded view of an air filter 50, a supercharger 24 (in dashed outline) an engine mounting support 51 (in dashed outline). A front connector mounting 52, a second drive pulley assembly 53 and a second pulley assembly mount 54 are depicted for use with a Continental-type engine (not shown).

The air filter 50 is of a standard type utilized with the specified supercharger. Preferred superchargers 31 are a SN-93 model manufactured by Paxton of Camarillo, Calif., USA and S-TRIM manufactured by Vortec of Channel Islands, Calif., USA. The frontal mounting 52 is made up of a frontal connector 54 having three extensions 55, 56 and 57 used for attachment of the front connector mounting 54 to the engine mounting tubings 58, 58*a* and 58*b*. The engine mounting 51 is attached to the aircraft firewall 59 bracing (not shown). Each of extensions 55, 56, and 57 has a slot 61.

The second pulley assembly 53 is made up of an engine driven pulley 62, a supercharger drive pulley 63, a belt tension adjustment pulley 64 cooperating through belt 65 and bolts and nuts as needed. The engine-driven pulley 62 and the belt tension adjustment pulley 64 are attached to mounting plate 26 through bearing housings 66. The mounting plate 26 is connected to the supercharger 24 through the use of bolts 67 (only one shown) just as frontal connector 54 is attached by bolts 68 through washers 69.

Figure 6:
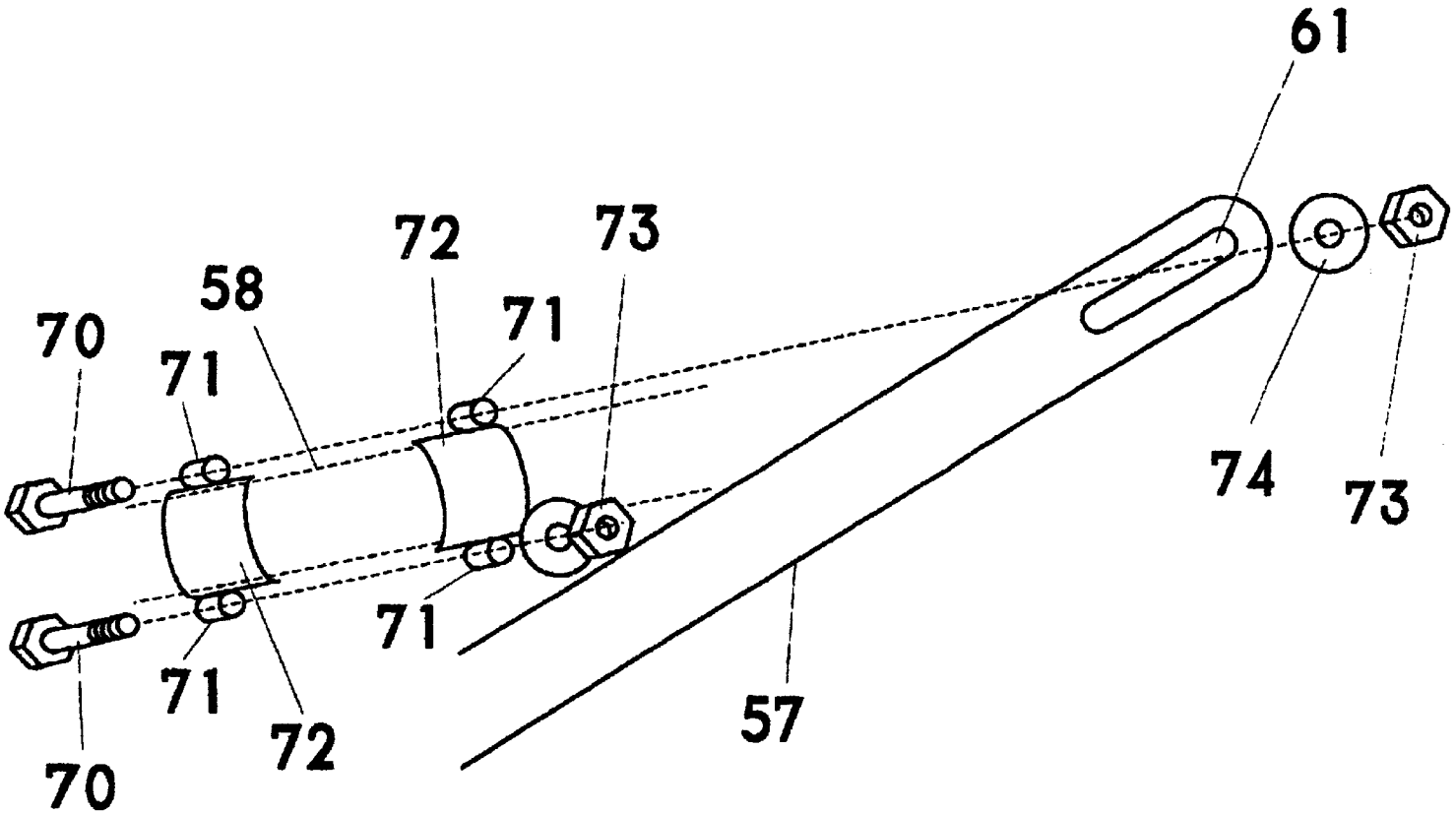
FIG. 6 depicts diagrammatically the connection of an extension of the additional mounting device to the tubing of block A of FIG. 5.

FIG. 6 provides additional detail about the typical attachment of an extension 57 of supercharger mounting 52 to tubing 58 (shown by dashed lines) of the motor mounting 51 (not shown). Extension 57 has a slot 61 which is fitted over a bolt 70 during installation. Bolt 70 is passed through connectors 71 on clamp halves 72 and fastened by nut 73 and washer 74.

Figure 7:
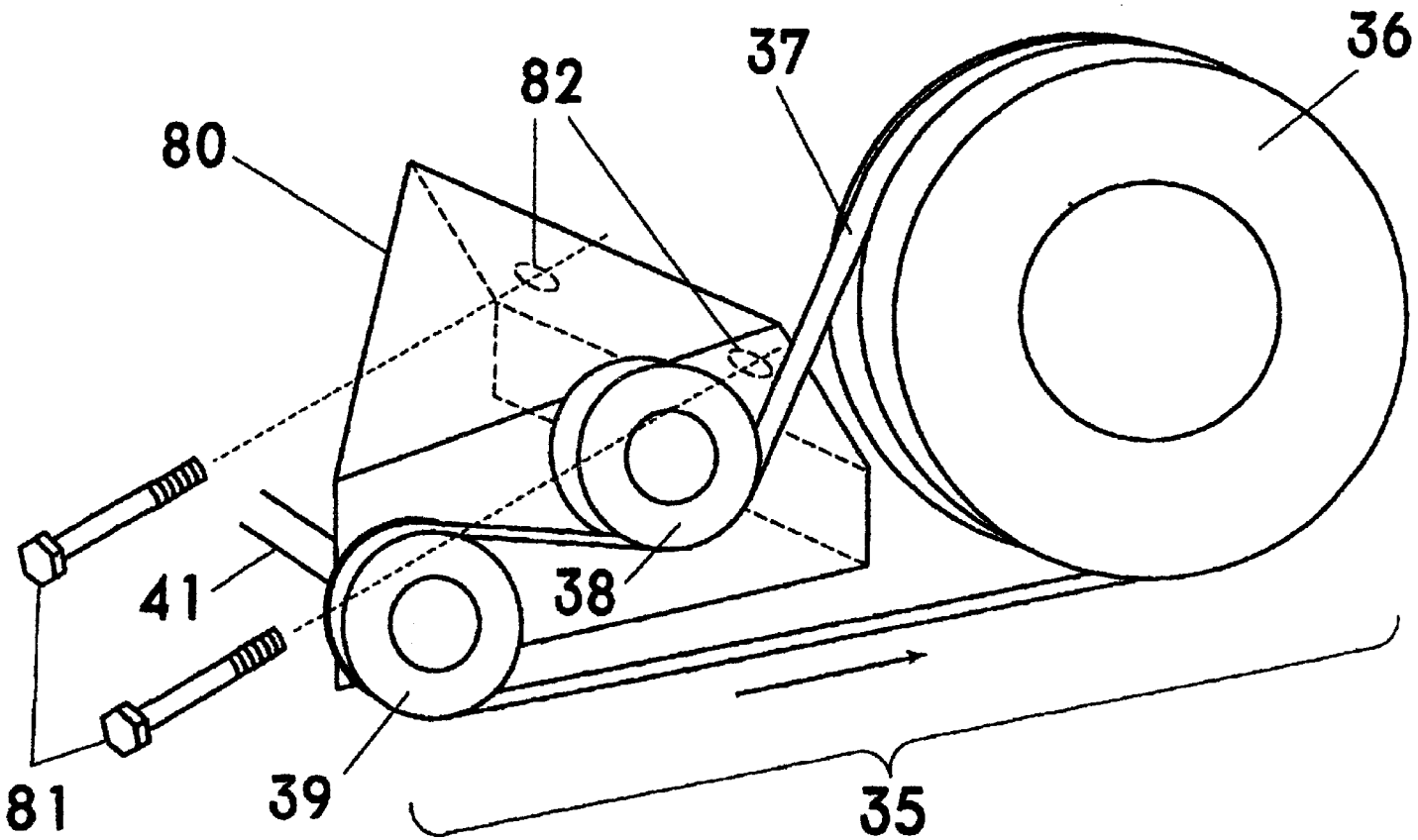
FIG. 7 depicts a mounting gusset for attachment of a belt drive assembly to a front corner of a Lycoming-type engine crankcase.

FIG. 7 provides detail about the support elements used in positioning the pulley assembly 35 and drive shaft 41 of FIG. 4. Mounting gusset 80 positions the belt tension adjustment pulley 38 and supercharger drive pulley 39. Mounting gusset 80 has a hole (not shown) including bearing rings (not shown) for supporting the forward end of drive shaft 41 and is attached to the Lycoming-type engine crankcase (not shown) by bolts 81 which are driven, through holes 82 in the far wall of the gusset 80, into bolt holes in the crankcase 31 (not shown).

Figure 8:
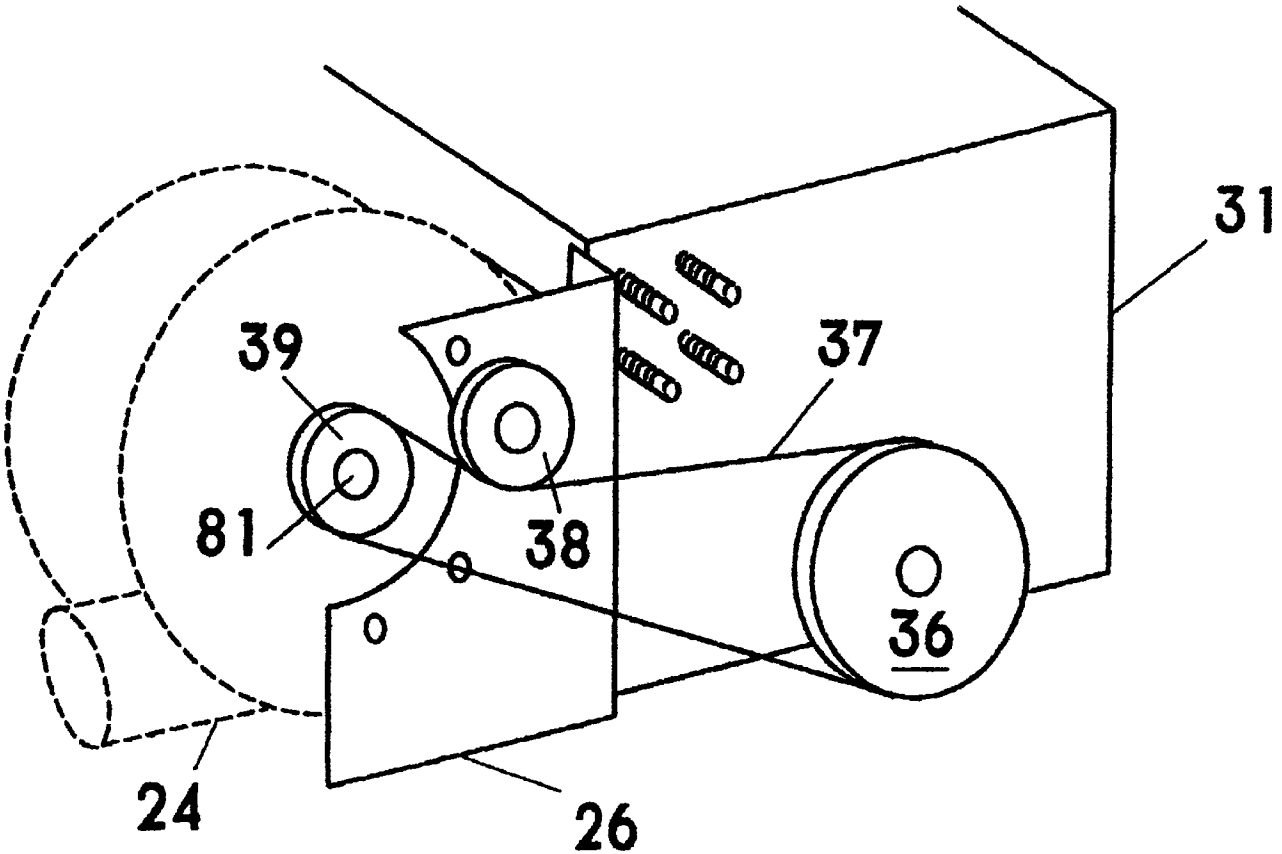
FIG. 8 is a rear view of the belt drive assembly of FIG. 3 as connected to the accessory drive of a Continental-type engine.

FIG. 8 depicts a view from the pilot's side of the preferred supercharger mounting arrangement of a single engine aircraft without a mounting bracket 25 in place. Pulley 39 is attached to the drive shaft 81 operating the impeller 83 (See FIG. 9) of supercharger 24 by the usual means.

Figure 9:
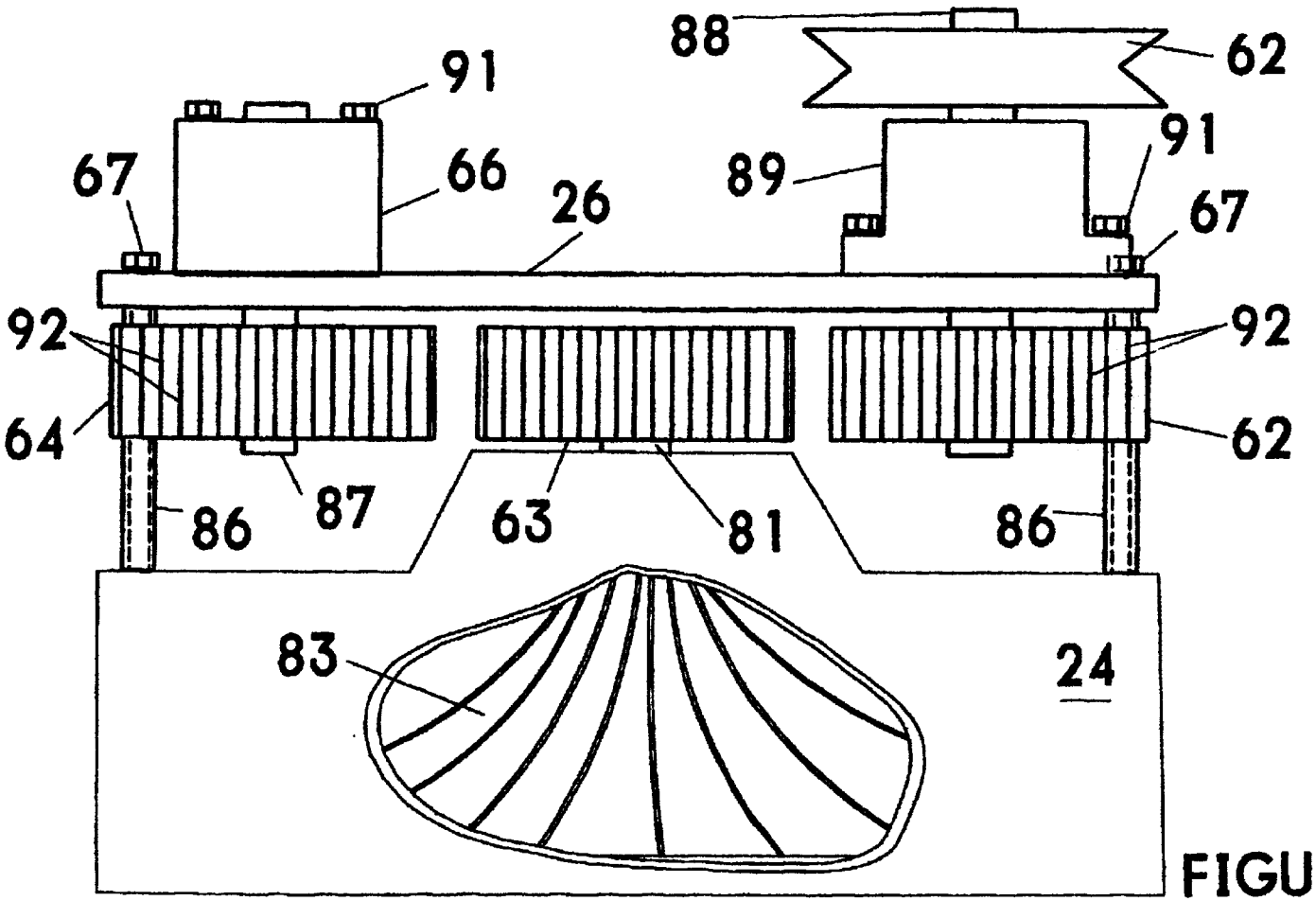
FIG. 9 provides additional detail regarding a belt drive assembly and its connection to a supercharger.

The pulley assembly of FIG. 9 is a side view without a belt in place. The supercharger 24 and its impeller 83 are connected to the supercharger drive pulley 63 by shaft 81 and to the mounting plate 26 by bolts 67 which are positioned by stand-offs 86.

The tension adjustment pulley 64 is positioned by shaft 87 and the position of bearing housing 66. Likewise, the engine driven pulley 62 is held in place by a shaft 88 and bearing housing 89. The bearing housings 66 and 89 are attached to the mounting plate 26 by bolts 91.

Each of the reverse drive pulleys 62, 63 and 64 have gear teeth 92 and the drive belt 65 (not shown), includes complementary teeth.

Preferred drive belts include Model TP 8008M-20, manufactured by Gates of Denver, Colo., USA, and Model D800H100 manufactured by Browning of Nashville, Ky., USA.

Figure 10:
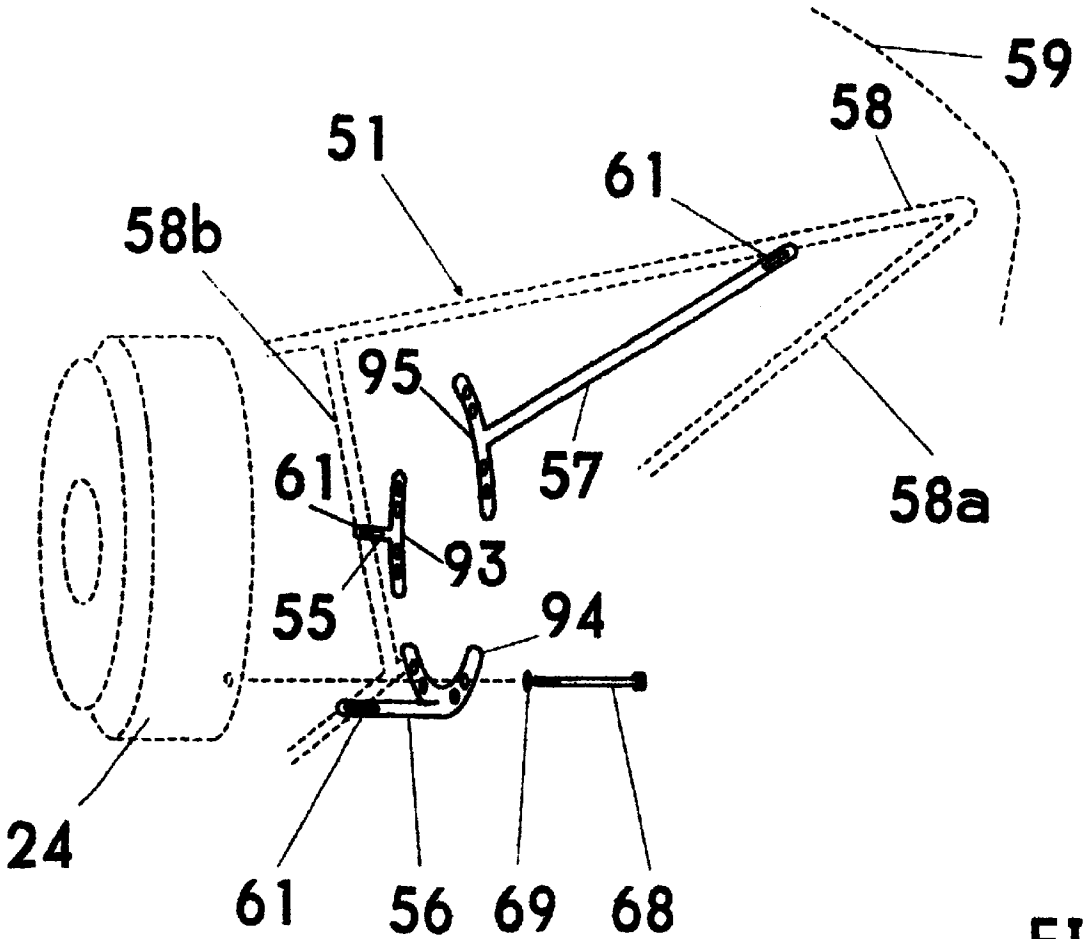
FIG. 10 depicts a modification of the frontal ring mounting of FIG. 5.

FIG. 10 depicts an alternative to the frontal ring of FIG. 5 where extensions 55, 56 and 57 are mounted on bases 93, 94 and 95 rather than a ring 54

Figure 11:
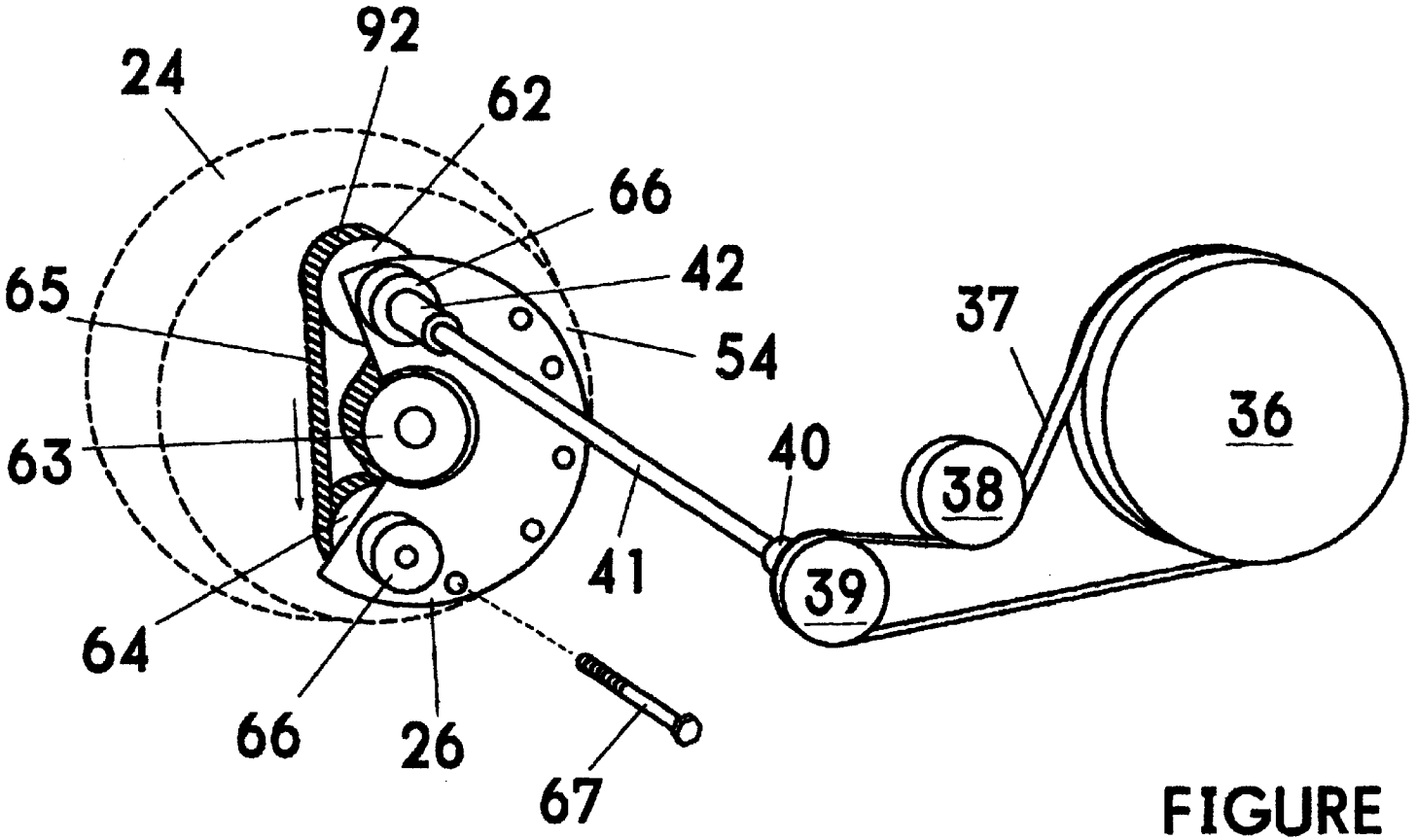
FIG. 11 depicts a modification of the drive train of FIG. 4.

FIG. 11 provides a second model kit for use with a Lycoming engine. In this model, the accessory drive pulley 36 is connected to the driveshaft pulley 39. Rotary power is then transferred through drive shaft coupling 40 and power drive shaft 41, then to a supercharger coupling 42 which engages a shaft driven pulley 62. Shaft driven drive pulley 62 transmits power through belt 65 to supercharger drive pulley 63. Belt 65 is held at an appropriate tension by belt tension adjustment pulley 64.

GENERAL DESCRIPTION OF THE INVENTION

While the mentioned aircraft and models are preferred, any aircraft having a separation space suitable [of] *for* the emplacement of a selected supercharger can be [retrofit] *outfitted* with kit components.

The separation space is defined in terms of the aft vertical baffle and the firewall separating the engine compartment from the passenger compartment or wing structure in some multi-engine craft. However, the separation space is not defined by the baffle but by the empty space adjacent the firewall. It is preferred that the separation space be from at least 26 cm deep to 51 cm deep and more preferably about 28 cm to about 41 cm in depth.

The air filtering device can be attached to the supercharger air intake or placed elsewhere in the engine compartment air stream to avoid heat from the air stream off the engine. When the air filter is separated from the supercharger air inlet, the two can be connected by the flexible conduits, such as SCAT and SCEEPT ducts.

The attachment of the supercharger to the aircraft will generally be through the use of studs or bolts as shown in the Figures. The attachment of the mounting gusset to the Lycoming-type engine will use the bolt holes in the crankcase normally used for attachment of an air conditioning unit. The use of a supercharger mounting with a frontal ring is not generally necessary. It is advantageous where the width of the separation space is sufficiently small that a "thin" mounting plate is required to mount the supercharger. The "frontal ring" mounting can then be used to reduce vibration and any resulting metal fatigue.

The set-up of the belt drive is predicated on the availability of space within the separation space, or the adjacent engine compartment as cowling configurations change from aircraft to aircraft and over time as models change and as owners customize their crafts. Thus, additional pulleys, belts and mountings can be added to avoid obstacles to the use of straight drive shafts like the drive shaft of FIG. 4 within the engine compartment.

The exact shapes and materials of the drive shafts mounting brackets, plates, gussets and clamps can also be modified to conform to design requirements brought about by the availability of new materials, in model changes and the statutes, regulations, rules and other regulatory or legal requirements. Those skilled in the art are warned to know and carefully apply the relevant law to ensure good health and safety during manufacture, the assembly and use of the component parts, the supercharger and kit assemblies and the deposition of the manufacturing, maintenance and repair scraps, chemicals and residues in an environmentally safe manner.

Now, having described my invention, what I claim is:

1. A supercharger [retrofit] kit for attachment of an automotive supercharger to at least one of an aircraft engine and an aircraft engine mounting within an engine compartment of an aircraft comprising:

a supercharger including an impeller, a pulley assembly means for connection of the aircraft engine accessory drive to the supercharger impeller for transferring rotary motion from an aircraft engine accessory drive to the supercharger impeller, the combination being presized for installation in or below the separation space of an aircraft engine compartment.

2. The supercharger [retrofit] kit of claim 1 wherein the pulley assembly means includes an accessory drive pulley, a tension adjustment pulley, a drive shaft pulley, a belt and a mounting plate.

3. The supercharger [retrofit] kit of claim 1 wherein the pulley assembly further includes attachment means for connecting the mounting plate to at least one of the aircraft engine and the engine mounting tubing.

4. The supercharger [retrofit] kit of claim 1 wherein the pulley assembly includes a mounting bracket.

5. The supercharger [retrofit] kit of claim 2 further including a supercharger front connector mounting means for attaching the supercharger to the engine mounting.

6. The supercharger [retrofit] kit of claim 5 wherein the supercharger front connector mounting means includes a ring portion to which extensions are attached.

7. The supercharger [retrofit] kit of claim 5 wherein the supercharger front connector mounting means includes a plurality of bases, each base having an extension.

8. The supercharger [retrofit] kit of claim 7 wherein the supercharger front connector includes three bases.

9. The supercharger [retrofit] kit of claim 1 wherein the pulley assembly means is attachable to the crankcase of the at least one engine.

10. The supercharger [retrofit] kit of claim 9 wherein the pulley assembly means is attachable to the crankcase proximate to the at least one engine's front end.

11. The supercharger [retrofit] kit of claim 10 wherein the pulley assembly means is attachable to the air conditioning attachment points of the at least one engine.

12. The supercharger [retrofit] kit of claim 1 wherein the pulley assembly means is attachable to the crankcase of the at least one engine proximate to the engine's rear end.

13. The supercharger [retrofit] kit of claim 1 includes a first pulley assembly presized to be attachable to the accessory drive of a Lycoming engine, a drive shaft assembly connecting the first pulley assembly to a second pulley, the second pulley assembly including a mounting plate means for connection to a supercharger.

14. The supercharger [retrofit] kit of claim 1 wherein the engine cowling or nacelle remains unmodified after installation of the supercharger.

15. An aircraft comprising at least one engine compartment having a separation space and a [retrofit] supercharger from a kit attached to the at least one of an engine and an engine mounting and positioned within or below the separation space, the supercharger including an impeller, a pulley assembly means for connection of the aircraft engine accessory drive and the supercharger impeller for transferring rotary motion from an aircraft engine accessory drive to the supercharger impeller, the combination being installed in or below the separation space of the aircraft engine compartment.

16. The aircraft of claim 15 wherein the pulley assembly means includes an accessory drive pulley, a tension adjustment pulley, a drive shaft pulley, a belt and a mounting plate to which each of the pulleys is attached.

17. The aircraft of claim 15 wherein the pulley assembly further includes attachment means for connecting the mounting plate to at least one of the aircraft engine and the engine mounting tubing.

18. The aircraft of claim 15 wherein the pulley assembly includes a mounting bracket.

19. The aircraft of claim 15 further including a supercharger front connector mounting means attaching the supercharger to the engine mounting.

20. The aircraft of claim 19 wherein the supercharger front connector mounting means includes a ring portion to which extensions are attached.

21. The aircraft of claim 19 wherein the supercharger front connector mounting means includes a plurality of bases, each base having an extension.

22. The aircraft of claim 20 wherein the supercharger front connector includes three bases.

23. The aircraft of claim 15 wherein the pulley assembly means is attached to the crankcase of the at least one engine.

24. The aircraft of claim 22 wherein the pulley assembly means is attached to the crankcase proximate to the at least one engine's front end.

25. The aircraft of claim 23 wherein the pulley assembly means is attached to the air conditioning attachment points of the at least one engine.

26. The aircraft of claim 15 wherein the pulley assembly means is attached to the crankcase proximate to the engine's rear end.

27. The aircraft of claim 15 wherein the engine cowling or nacelle remains unmodified after installation of the supercharger.

28. A supercharger [retrofit] kit for attachment of an automotive supercharger to at least one of an aircraft engine and an aircraft engine mounting within an engine compartment of an aircraft comprising:

supercharger including an impeller, a pulley assembly means for connection of the aircraft engine accessory drive to the supercharger impeller for transferring rotary motion from an aircraft engine accessory drive to the supercharger impeller, the combination being presized for installation in or below the separation space of an aircraft engine compartment, and at least one of a mounting plate and a mounting bracket.

29. The supercharger [retrofit] kit of claim 28 further including an additional mounting device for attaching a supercharger to the engine mounting tubing.

30. The supercharger [retrofit] kit of claim 29 further including a mounting gusset and drive train.

* * * * *